Sept. 4, 1956  J. L. HEIDLER  2,761,423
LIQUID CONTAINER
Filed Sept. 26, 1952

Inventor.
Jacob L. Heidler.
By Alice & Lee Attys.

United States Patent Office 2,761,423
Patented Sept. 4, 1956

2,761,423

LIQUID CONTAINER

Jacob L. Heidler, Chicago, Ill.

Application September 26, 1952, Serial No. 311,640

3 Claims. (Cl. 119—72)

The invention relates generally to liquid containers, or receptacles, and more particularly to containers which are open ended in use, and which may be subjected to jars and vibrations.

The invention has among its objects the production of a liquid container, or receptacle, which is particularly adapted for use as a drinking or watering container for poultry, animals, etc., while the latter are being transported, and which is so constructed that splashing and spilling is substantially eliminated, even though the container is subjected to the normal jars, shocks, and vibrations attendant to railroad, and other forms of transportation.

Another object of the invention is the production of such a container, or receptacle which while very efficient and durable in use, is simple in construction, and inexpensive to manufacture both when constructed as a reusable receptacle, and as an expendable item.

A further object of the invention is the production of a receptacle having the above advantages which readily adapts itself to fabrication from paper, or similar materials, as well as plastics, metals, or other relatively durable materials, and which may be provided with novel means for retaining the receptacle in operative position in a shipping container, or the like.

Many other objects and advantages of the construction herein shown and described will be obvious to those skilled in the art from the disclosure herein given.

To this end, my invention consists in the novel construction, arrangement, and combination of parts herein shown and described, and more particularly pointed out in the claims.

In the drawings, wherein like reference characters indicate like or corresponding parts:

Figure 1:
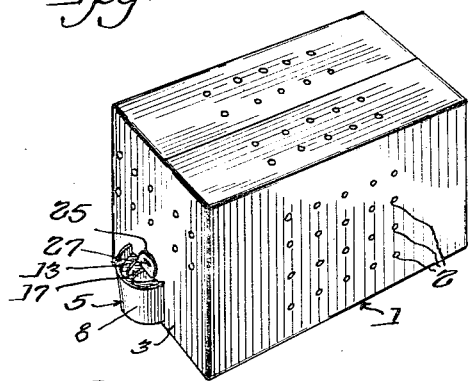
Fig. 1 is a perspective view of a box for shipping small, live animals, and the like, illustrating the application of the present invention thereto.

In shipping small animals, poultry, such as baby chicks, and the like, by rail, or other transportation, considerable difficulty has been experienced in maintaining an adequate supply of drinking water in the box, or other container, in which the animal or chicks are placed, as considerable splashing normally results from jars, shocks, and vibrations to which the box, or container, is normally subjected during shipment. The problem is further aggravated in the case of a shipment of small animals, baby chicks, and the like which are normally shipped in boxes constructed of corrugated board, fiber board, or other wood pulp materials which readily absorb moisture, so that excessive spilling of liquid within the container oftentimes results in the container being rendered unfit for protecting the health of the animals being shipped therein, as well as causing damage to the container with the attendant danger of breaking or splitting of the carton, and possible loss of the contents thereof. This problem has caused considerable concern not only among shippers of valuable animals, with respect to the possible loss or damage to the animal resulting from damp, unhealthy conditions, and inability to provide an adequate supply of drinking water for the animal; but also among express agencies and transportation companies, which likewise have occasioned considerable loss as a result of their inability to maintain proper conditions for the animals being shipped. It will be apparent that in those cases where excessive splashing is not prevented, the condition is further unintentionally aggravated by persons responsible for taking care of the container in shipment, as the continual filling of the container in an effort to maintain a sufficient supply of water therein following successive spilling, results in a considerable amount of water being deposited within and absorbed by the shipping container. Obviously the receptacle for drinking water must have a sufficient opening at the top thereof to permit easy access by the animals to the liquid, so that the relatively large opening normally employed in prior containers permits the liquid to be readily and quickly expelled therefrom under the usual shocks and jars to which it is subjected in transit.

The present invention contemplates the production of a liquid receptacle which is so designed that under normal condition spillage is, for all practical purposes, completely eliminated. Referring to the drawings, and particularly to Figs. 1 through 4, the reference character 1 indicates generally a shipping box or container which is illustrated as being suitable for a small animal, such as a dog, or the like, and which is provided with suitable means, such as vent holes 2, in the sides, top, and ends of the box for providing ventilation to the interior thereof. Positioned at the one end wall 3 adjacent the bottom 4 is a drinking receptacle, or container, indicated generally by the numeral 5, the container 5 being positioned in an opening 6 in the end wall 3 of the box whereby half the receptacle 5 is positioned within the box, and the other half extends outwardly therefrom.

Figure 2:
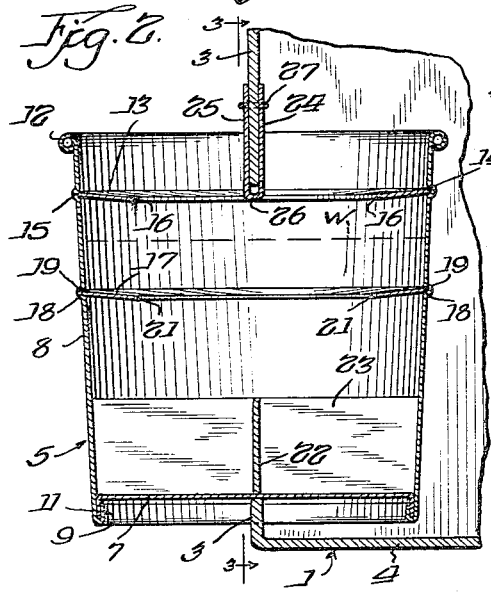
Fig. 2 is a sectional view of the receptacle and portion of the shipping box illustrated in Fig. 1, taken approximately on the line 2—2 of Fig. 3.
Figure 3:
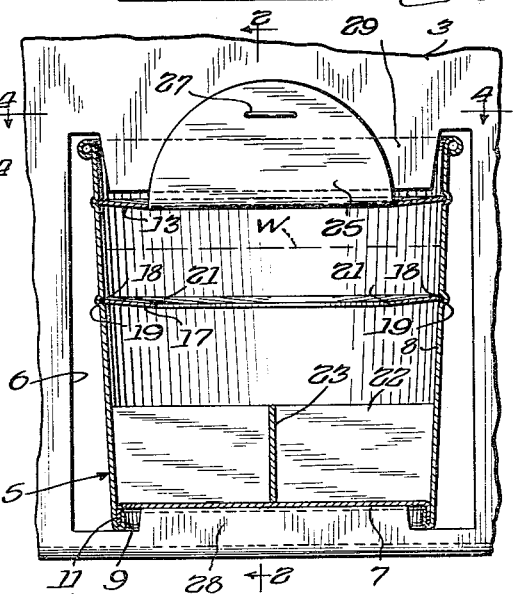
Fig. 3 is a sectional view taken approximately on the line 3—3 of Fig. 2.
Figure 4:
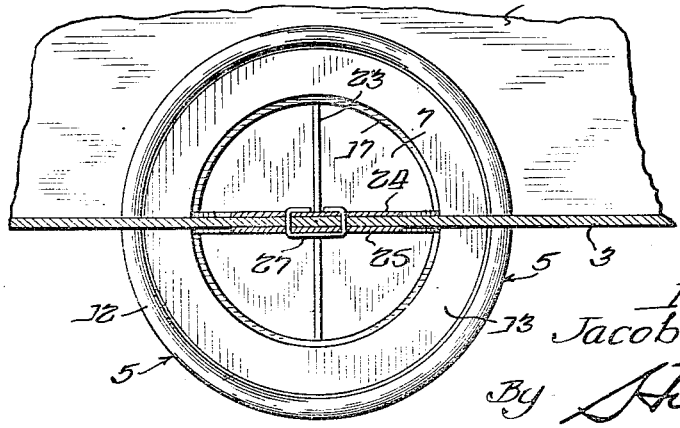
Fig. 4 is a sectional view taken approximately on the line 4—4 of Fig. 3.

The embodiment of the invention illustrated in Figs. 2, 3, and 4 is constructed in a manner similar to the usual paper, or like containers such as are commonly used for drinking cups and dairy, and other products, comprising a bottom 7 of generally circular shape to which is secured a generally tubular shaped side wall member 8, the latter being secured to the bottom 7 by means of a turned-in flange 9 which engages a downwardly extending, peripheral flange 11 on the bottom 7, and is secured thereto by suitable bonding, with the upper edges of the side walls 8 terminating in a rolled lip 12. The construction thus far described is commonly employed in drinking cups and waterproof containers, or receptacles, employed in the dairy, and other industries, such details of which form no part of the present invention.

Positioned in the body thus formed by the bottom 7 and side wall member 8 is an annular shaped member 13 which is connected to the member 8 by any suitable means as, for example, bonding the outer peripheral edge 14 of the member 13 to the side walls, and in the embodiment of the invention illustrated, the side wall member 8 is provided with a circumferential groove or recess 15 in the inner face of the member 8 adapted to receive the edge 14 of the member 13, with the external diameter of the member 13 being of a size to insure a snug fit in the recess 15, thereby providing an interlocking construction which, as desired, may or may not be bonded together. As clearly illustrated in Figs. 2 and 3, the plane of the inner edge 16 of the member 13 is positioned below the plane of the outer edge 14, whereby the member 13, in effect, constitutes a flange extending inwardly from the side wall member 8, and inclined radially from the inner edge 16 toward the outer edge 14, such flange being spaced downwardly from the top edge 12, or mouth of the receptacle. Positioned below the member 13 is a second annular member 17 which, in this embodiment of the invention, is constructed and secured to the side wall member 8 in substantially the same manner as the member 13, the side wall member 8 being provided with a recess 18 corresponding to the recess 15 in which is positioned the external, peripheral edge 19 of the member 17, the latter likewise being radially inclined from its inner peripheral edge 21 outwardly toward the outer edge 19. The member 17 is preferably so positioned in the receptacle with respect to the member 13 that the normal water line W will lie between the members 13 and 17, as indicated in Fig. 2. The radial inclination of the members 13 and 17 is preferably from approximately fifty to eighty degrees with respect to the vertical, or the side wall member 8, providing adequate inclination to insure that any water splashed above the member 13 will drain back into the receptacle, and thereby provide efficient retention of the liquid within the receptacle. If desired, one or more baffles may be positioned within the receptacle adjacent the bottom thereof as, for example, the transversely extending baffle members 22 and 23 which, in the embodiment illustrated in Figs. 2, 3 and 4, extend radially at right angles to one another, and are formed from similar material to that forming the members 13, 17, and the receptacle proper, the members 22 and 23 being suitably secured to the receptacle body.

In use, the members 13 and 17 reduce the tendency of the liquid in the receptacle to move upwardly along a portion of the side wall member 8 when the receptacle is subjected to lateral shocks. It will be appreciated that in an ordinary open-ended container or receptacle as, for example, a drinking glass, lateral movement of a partially filled glass will result in the liquid moving from side to side in the direction of movement of the receptacle, and rising along the respective portions of the glass side walls at opposite ends of the line of movement. Where the normal surface of the liquid is positioned in the upper portion of the glass, relatively little movement is required to splash the liquid over the mouth of the glass, and out of the same. However, in the construction illustrated, all, or substantially all of the surface portion of the liquid which would tend to rise along the side walls is trapped underneath the member 13 and, in the event that a small portion of the liquid is splashed above the member 13, it may strike the inner surface of the side wall member 8 extending above the member 13, and run down the same, as well as the top surface of the member 13, back into the receptacle. While the use of only a single member 13 will materially reduce splashing and may be sufficient in certain applications, the utilization of the member 17 in combination with the member 13 results in still greater efficiency, the member 17, acting in a similar manner with respect to the portion of the liquid positioned below the member 17, preventing a large portion of the energy in the liquid therebelow, resulting from lateral movement of the receptacle, from being transmitted along the side walls to the liquid thereabove. Thus the member 17 reduced the force that would otherwise be applied to liquid striking the lower surface of the member 13, which otherwise might produce a relatively large splashing effect, with possible splashing over the mouth of the receptacle. While the baffles 22 and 23 likewise reduce movement of the liquid in the bottom of the receptacle, and thus tend to reduce the forces of liquid acting on the member 17, I have found that satisfactory results in practically all applications are achieved by the use of merely the two members 13 and 17.

Means is also provided in the construction illustrated in Figs. 2, 3, and 4 for securing the receptacle 5 to the wall 3 of the box 1, such means consisting of one or more flaps 24 and 25 which are operatively connected to the receptacle 5 and, in turn, secured to the end wall 3 of the box 1. In the embodiment of the invention illustrated, the flaps 24 and 25 are formed from the material embodied in the member 13, and comprise the portions of the material cut away to form the opening defined by the inner edge 16 of the member 13, it being noted from a reference to Figs. 2 and 4 that a small strip 26 is left integrally connected to the opposite sides of the member 13 from which the flaps 24 and 25 extend. In mounting the receptacle in the box 1, the receptacle is positioned in the opening 6 with the flap 24 on the inner face of the inner wall 3, and the flap 25 at the outer face thereof, the flaps being secured thereto by any suitable means, as, for example, a staple 27 passing through both flaps and the end wall. The opening 6 is preferably so shaped that an upwardly extending flange 28 is provided along the bottom of the opening, and a downwardly extending flange 29 at the top thereof, the respective flanges being so proportioned that they will extend between the side walls of the receptacle, with the top edge of the flange 28 providing additional means for supporting the receptacle, and the lower edge of the flange 29 extending down to adjacent the member 13, thus forming an interlocking construction which will very effectively retain the receptacle in operative position in the box. In use, the size of the receptacle 5 will be so selected both as to diameter and height as to provide ready access by the animal, poultry, etc., to the liquid at the inner half of the receptacle, and as the other half of the receptacle is positioned at the outside of the container, the receptacle may be readily filled from the exterior of the box, eliminating any necessity of opening the latter to accomplish the same. Likewise, the outer half provides visual means for ascertaining the amount of liquid therein during use and filling thereof.

Figure 5:
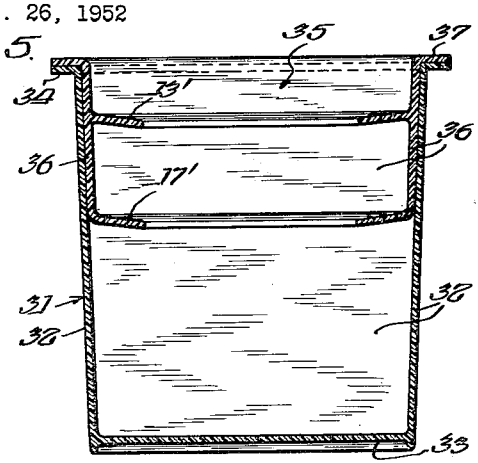
Fig. 5 is a sectional view similar to Fig. 1 illustrating an application of the present invention to a receptacle formed from plastic, or other similar material.

The embodiment of the invention illustrated in Fig. 5 is designed for fabrication from plastic, or other suitable material, whereby the finished receptacle is of relatively permanent nature adapted to be reused; whereas the construction illustrated in Figs. 1 through 4 is primarily designed as an expendable item which would normally be used only once, and then disposed of. Referring to Fig. 5, the reference numeral 31 indicates generally a receptacle of rectangular cross section having side walls 32 and a bottom wall 33 constructed as an integral assembly from plastic, or other material, the upper edge or mouth of the receptacle having an outwardly extending peripheral flange 34. Positioned in the receptacle 31 is a separately formed insert or sleeve, indicated generally by the numeral 35, having side walls 36 which are complementary to the inner surface of the walls 32, and likewise terminating at its upper edge in an outwardly extending peripheral flange 37 which is adapted to seat on the flange 34. Extending inwardly from the walls 36 of the insert 35 is a pair of annular shaped members 13' and 17' corresponding to the members 13 and 17 in the construction illustrated in Figs. 1 through 4. The insert 35 may be operatively secured to the receptacle 31 by any suitable means as, for example, friction, cementing, bonding, or other securement suitable for the purposes intended. It will be noted that in this construction, as in that previously described, the members 13' and 17' are inclined, and are so positioned with respect to one another and the upper edge of the receptacle that spillage is substantially eliminated, this construction also illustrating an embodiment of the invention wherein additional baffles, and the like, are omitted.

It will be apparent that while I have illustrated two embodiments of the invention, one adapted to be formed from a suitable paper material, or the like, and the other preferably from plastic, or other moldable material, the invention may also be embodied in receptacles constructed of glass, metal, and other materials, or a combination thereof. Likewise, while I have disclosed my invention primarily in connection with shipping boxes for poultry or live animals, it is believed apparent that the invention may also be utilized for other purposes wherein the container for the liquid is subject to movement which might otherwise result in spillage, one example being as a drinking cup for passengers on moving trains, and other vehicles, with the construction illustrated in Fig. 5 being particularly suitable for this purpose.

I am aware that containers have been designed employing an inwardly flanged lip, or the like, but as may be readily demonstrated by tests, constructions of such type, while reducing spillage to a certain extent, still permit a considerable portion of liquid to be splashed out when the container is subjected to relatively slight shocks and movements, particularly where the container is relatively full. However, in applicant's construction, the upper portion of the receptacle positioned above the upper member 13 forms a guard which prevents any spillage of liquid other than from excessive shocks which would not normally be encountered in its use, such results being achieved, in part, by the combination of the spaced members 13 and 17, which normally are respectively positioned above and below the normal water line, with the member 17 thus reducing the action of the liquid against the upper member 13. It will also be noted that I have provided a receptacle having the above advantages which may be very economically manufactured as an expendable item, at the same time providing novel means for securing the receptacle within a shipping box, or other container.

Having thus described my invention, it is obvious that various immaterial modifications may be made in the same without departing from the spirit of my invention; hence, I do not wish to be understood as limiting myself to the exact form, construction, arrangement, and combination of parts herein shown and described, or uses mentioned.

What I claim as new and desire to secure by Letters Patent is:

1. In a liquid drinking receptacle for attachment to a shipping container or other supporting means, the combination of a body structure having a bottom member and side walls extending upwardly therefrom forming a receptacle open at its upper end, a disk-like member comprising an annular flange providing an opening and positioned in said receptacle adjacent to but spaced downwardly from the upper edge of the body structure, said flange being inclined upwardly from the periphery of the opening, and mounting means formed from the disk-like member and providing the opening and operatively connected to and extending upwardly from the receptacle, said mounting means operatively affixed to the annular flange and when positioned adjacent to a portion of a container is adapted to provide means for securing the receptacle to the container.

2. In a liquid drinking receptacle for attachment to a shipping container or other supporting means, the combination of a body structure having a bottom member and side walls extending upwardly therefrom forming a receptacle open at its upper end, an annular flange providing an opening and positioned in said receptacle adjacent to but spaced downwardly from the upper edge of the body structure, said flange being inclined upwardly from the periphery of the opening, and a mounting member operatively connected to the annular flange and extending upwardly from the receptacle for positioning adjacent to a portion of a container or other supporting means to provide means for securing the receptacle thereto.

3. In a liquid drinking receptacle for attachment to a shipping container or other supporting means, the combination of a body structure having a bottom member and side walls extending upwardly therefrom forming a receptacle open at its upper end, an annular member providing an opening positioned in said receptacle adjacent to but spaced downwardly from the upper edge of the body structure, said member being inclined upwardly from the periphery of the opening, said annular member having a strip extending between and connected to opposite portions thereof, and a pair of mounting flaps, said flaps forming the opening, each connected along one of their respective edges to said strip, the transverse width of said strip being approximately equal to the thickness of a side wall of a container on which it is to be used whereby the respective flaps may be positioned adjacent opposite faces of said side wall.

References Cited in the file of this patent

UNITED STATES PATENTS

| | | |
|---|---|---|
| 1,242,045 | Roehm | Oct. 2, 1917 |
| 1,435,404 | Lloyd | Nov. 14, 1922 |
| 1,760,761 | March | May 27, 1930 |
| 1,879,332 | Kulk | Sept. 27, 1932 |
| 1,909,244 | Ahlman | May 16, 1933 |
| 2,422,438 | Richards | June 17, 1947 |
| 2,503,045 | Hamilton | Apr. 4, 1950 |

FOREIGN PATENTS

| | | |
|---|---|---|
| 305,371 | Great Britain | Feb. 7, 1929 |
| 313,376 | Great Britain | June 13, 1929 |